June 14, 1932.  J. E. BAILEY  1,863,461
AUTOMOBILE HOOD LOCK
Filed Oct. 3, 1930   2 Sheets-Sheet 1
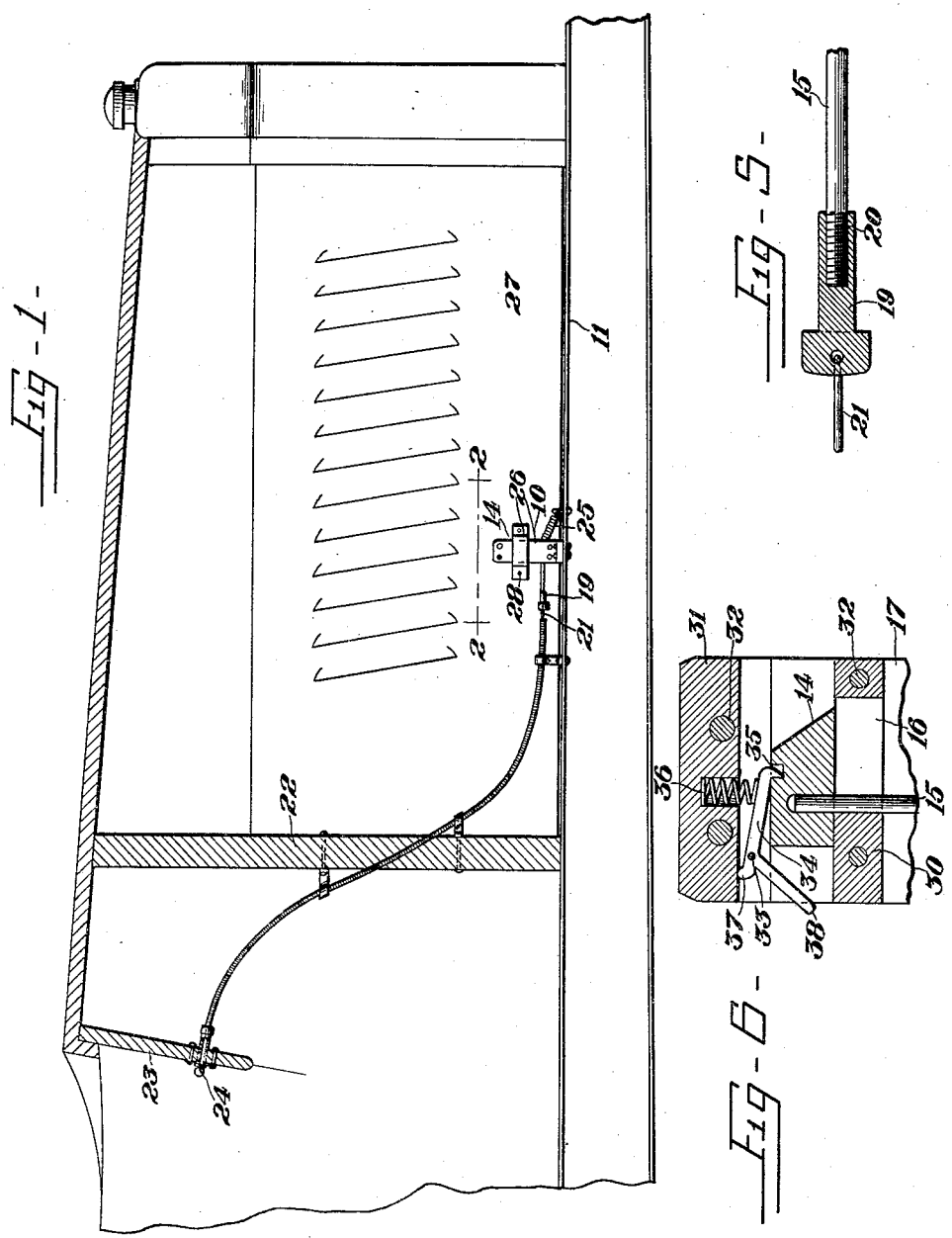
Joseph E. Bailey
INVENTOR
BY Victor J. Evans
ATTORNEY June 14, 1932.     J. E. BAILEY     1,863,461
AUTOMOBILE HOOD LOCK
Filed Oct. 3, 1930     2 Sheets-Sheet 2
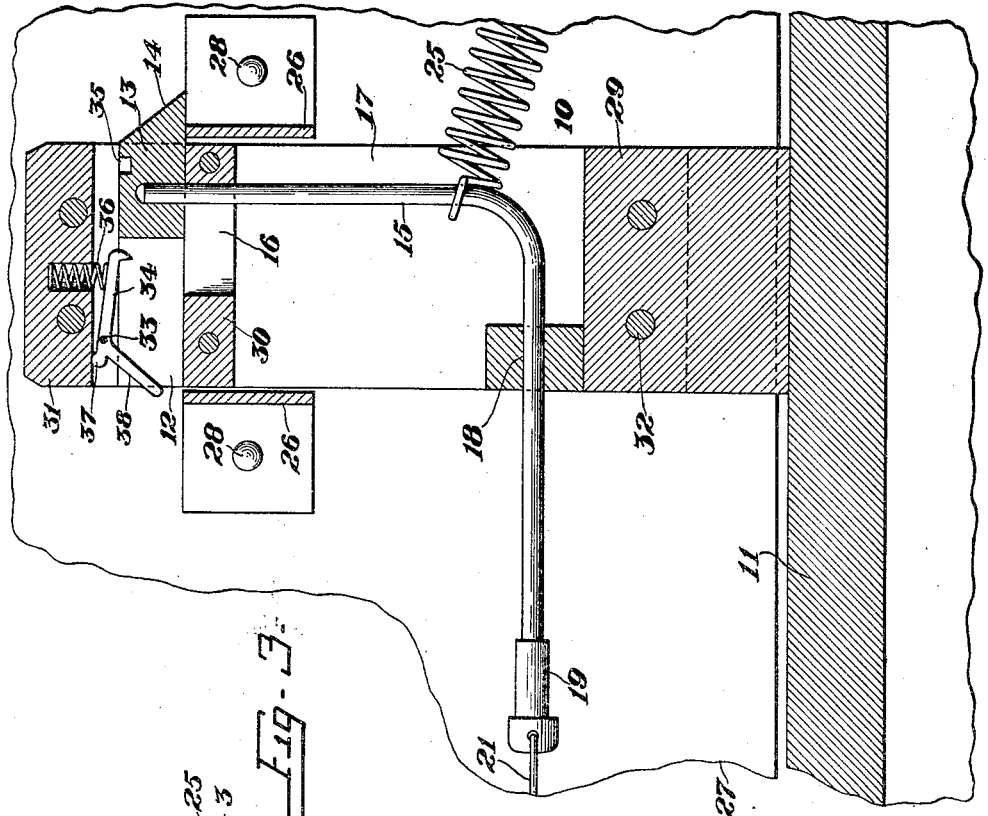
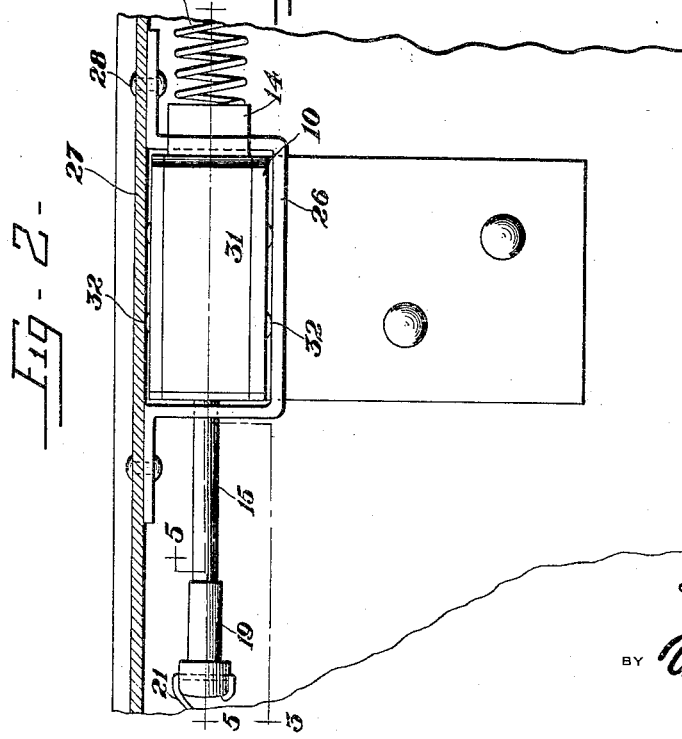
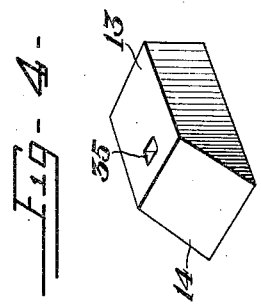
Joseph E. Bailey
INVENTOR
BY Victor J. Evans
ATTORNEY Patented June 14, 1932

1,863,461

UNITED STATES PATENT OFFICE

JOSEPH E. BAILEY, OF DAYTON, OHIO

AUTOMOBILE HOOD LOCK

Application filed October 3, 1930. Serial No. 486,253.

This invention relates to improvements in locks for automobile hoods, an object being to provide a lock which will automatically operate to hold the hood closed and may be actuated from the interior of the automobile to release the hood, the invention eliminating the unsightly and troublesome hood clamps upon the outside of the hood, and at the same time preventing persons from tampering with or removing parts from beneath the hood.

Another object of the invention is the provision of a hood lock which is simple in construction, efficient and reliable in use, and will automatically operate to lock the hood when the latter is closed, but may only be operated to release the hood from the interior of the automobile, so that when the doors of the latter are locked the hood cannot be opened.

With the above and other objects in view, the invention further includes the following novel features and details of construction, to be hereinafter more fully described, illustrated in the accompanying drawings and pointed out in the appended claims.

In the drawings:—

Figure 1 is a sectional view taken through the hood of an automobile and showing the invention applied, the engine and other parts usually located beneath the hood, being omitted.

Figure 2 is an enlarged fragmentary sectional view on the line 2—2 of Figure 1.

Figure 3 is a section on the line 3—3 of Figure 2.

Figure 4 is a detail perspective view of the latch.

Figure 5 is a sectional view illustrating the connection between the latch rod and the Bowden wire.

Figure 6 is a fragmentary view illustrating the latch held in retracted position.

Referring to the drawings in detail wherein like characters of reference denote corresponding parts, the invention is illustrated as applied to one side of the hood of an automobile, but obviously, in order to completely lock the hood the mechanism about to be described will be duplicated upon the opposite side.

In carrying out the invention, there is provided a member 10 which is rigidly secured to the frame 11 of the automobile beneath the hood. This member is provided near its top with oppositely located guide grooves 12 within which is slidingly mounted a latch 13 whose outer end is beveled as shown at 14. This latch has secured thereto one end of a substantially L-shaped latch rod 15 which operates through a slot 16 provided in the member 10. The rod 15 extends into an opening 17 provided in said member and is slidable through an opening 18 which is disposed horizontally. A coupling 19 is threadedly mounted upon the end of the rod as shown at 20 and this coupling provides connection with one end of a Bowden wire 21. This wire extends through the dash 22 of the automobile and through the instrument board 23, adjacent one end of the latter, where it is provided with an operating knob 24.

By pulling upon the knob 24, the latch 13, through the connections 21 and 15, will be retracted, movement in this direction being yieldingly resisted by a spring 25.

In its extended position, the latch is designed to engage a keeper 26. This keeper is substantially U-shaped and has its opposite ends secured to the inside of the hood 27 of the automobile as shown at 28. The member 10 will extend upward through this keeper as shown in the drawings, when the hood is closed and when in closed position, the latch 13 will be projected outward beyond the side edge of the member 10 to engage the keeper. When in retracted position the latch will be within the side edges of the member 10 so that the keeper may receive this member.

The member 10 may be formed of spaced plates connected by spacing members 29, 30 and 31, the latter being secured between the plates by means of rivets or equivalent fastening devices 32.

Pivotally mounted within the member 10 as shown at 33 is a hook 34 and the bill of this hook is adapted to engage within a recess or notch 35 provided in the upper face of the latch 13. A spring 36 acts to yieldingly force the hook downward, while a stop 37 provided at one end of the hook engages the separating member 31 to limit downward movement. The hook has extending therefrom an arm 38.

As previously stated, the invention is duplicated upon opposite sides of the automobile within the hood, so that either side of the hood may be independently locked or released and as the hood can only be released from the inside of the automobile, the hood cannot be raised when the automobile is locked.

By pulling upon the proper knob 24 either side of the hood may be unlatched, the pulling operation acting to retract the latch 13 against the action of the spring 35. As the latch moves inward, its inner end strikes the beveled bill of the hook 34 so that this hook will ride over the upper face of the latch and engage within the notch 35 so as to permit the hood to be raised. When the hood is closed, downward movement of the hood will cause the keeper to engage the extended end of the arm 38 of the hook so that the latter will be disengaged from the latch and will be automatically moved outward into keeper engaging position by means of the spring 25. There is sufficient play between the keeper and the member 29 to permit of the keeper being raised without engaging the extended end of the arm 38, and to engage said extended end while the hood is being closed.

The invention is susceptible of various changes in its form, proportions and minor details of construction and the right is herein reserved to make such changes as properly fall within the scope of the appended claims.

Having described the invention what is claimed is:—

1. In an automobile hood lock, a frame carried member, a latch slidingly supported thereby, a hood carried keeper adapted to be engaged by the latch to hold the hood closed, an L-shaped member to yieldingly hold the latch in keeper engaging position, means to disengage the latch from the keeper, and means to hold the latch in disengaged position.

2. In an automobile hood lock, a frame carried member, a latch slidingly supported thereby, a hood carried keeper adapted to be engaged by the latch to hold the hood closed, means to yieldingly hold the latch in keeper engaging position, means to disengage the latch from the keeper, a spring influenced hook engageable with the latch to hold the latter in disengaged position, an arm formed integral with the hook for engagement by the keeper during closing movement of the hood to actuate the keeper and release the latch.

3. In an automobile hood lock, an upwardly extending frame carried member provided with a slot, a hood carried keeper receiving said member when the hood is closed, a latch slidable horizontally in said member and engaging the keeper to hold the hood closed, means extending upwardly through the slot of the frame carried member to yieldingly hold the latch in keeper engaging position, means to retract the latch, means carried by the upwardly extending member and engaging the latch to hold said latch retracted, and means operated during closing movement of the hood to release the latch.

4. In an automobile hood lock, a frame carried member provided with oppositely disposed guide grooves, a latch slidably supported in the grooves, a hood carried keeper arranged at opposite side of said member, means to yieldingly hold the latch in keeper engaging position, means to disengage the latch from the keeper, means to hold the latch in disengaged position, and means engaged by the keeper during closing movement of the hood to release the latch.

5. In an automobile hood lock, a frame carried member provided with oppositely disposed guide grooves, a latch slidably supported in the grooves, a U-shaped hood keeper arranged at opposite sides of said member, means to yieldingly hold the latch in keeper engaging position, means to disengage the latch from the keeper, means to hold the latch in disengaged position, and means engaged by the keeper during closing movement of the hood to release the latch.

In testimony whereof I affix my signature.

JOSEPH E. BAILEY.